US009253091B2

(12) United States Patent
You et al.

(10) Patent No.: US 9,253,091 B2
(45) Date of Patent: Feb. 2, 2016

(54) METHOD FOR PROCESSING A REQUEST IN AN INFORMATION-CENTRIC COMMUNICATION NETWORK

(71) Applicant: ORANGE, Paris (FR)

(72) Inventors: Wei You, Xi'An (CN); Patrick Truong, Perros-Guirec (FR); Bertrand Mathieu, Pleumeur-Bodou (FR); Jean Francois Peltier, Ploumilliau (FR)

(73) Assignee: Orange, Paris (FR)

( * ) Notice: Subject to any disclaimer, the term of this patent is extended or adjusted under 35 U.S.C. 154(b) by 69 days.

(21) Appl. No.: 14/359,860

(22) PCT Filed: Nov. 20, 2012

(86) PCT No.: PCT/FR2012/052677
§ 371 (c)(1),
(2) Date: May 21, 2014

(87) PCT Pub. No.: WO2013/076418
PCT Pub. Date: May 30, 2013

(65) Prior Publication Data
US 2014/0314093 A1    Oct. 23, 2014

(30) Foreign Application Priority Data
Nov. 22, 2011   (FR) ..................... 11 60632

(51) Int. Cl.
*H04L 12/28*   (2006.01)
*H04L 12/743*  (2013.01)
*H04L 29/12*   (2006.01)
*H04L 12/725*  (2013.01)
*H04L 12/741*  (2013.01)

(52) U.S. Cl.
CPC .......... *H04L 45/7457* (2013.01); *H04L 45/306* (2013.01); *H04L 45/54* (2013.01); *H04L 45/7453* (2013.01); *H04L 61/1582* (2013.01)

(58) Field of Classification Search
CPC .................................. H04L 45/7457
USPC .............................. 370/392–395.5
See application file for complete search history.

(56) References Cited

U.S. PATENT DOCUMENTS

| 2005/0195832 | A1  | 9/2005 | Dharmapurikar et al. |
| 2009/0028160 | A1* | 1/2009 | Eswaran ............... H04L 45/745 370/395.32 |
| 2010/0040067 | A1  | 2/2010 | Hao et al. |
| 2012/0084459 | A1* | 4/2012 | Wu ..................... H04L 45/7453 709/238 |

FOREIGN PATENT DOCUMENTS

EP    2214357 A1    1/2010

OTHER PUBLICATIONS

International Preliminary Report on Patentability and English translation of the Written Opinion dated May 27, 2014 for corresponding International Application No. PCT/FR2012/052677, filed Nov. 20, 2012.
International Search Report and Written Opinion dated Jan. 31, 2013 for corresponding International Application No. PCT/FR2012/052677, filed Nov. 20, 2012.
Van Jacobson et al., "Networking Named Content" Context '09 Proceedings of the 5th International Conference on Emerging Networking Experiments and Technologies; Dec. 1-4, 2009; Rome, Italy, Associated for Computing Machinery, New York, NY, USA, Dec. 1, 2009, pp. 1-12, XP002608160.
French Search Report and Written Opinion dated Aug. 30, 2012 for corresponding French Application No. 1160632, filed Nov. 22, 2011.

* cited by examiner

*Primary Examiner* — Iqbal Zaidi
(74) *Attorney, Agent, or Firm* — David D. Brush; Westman Champlin & Koehler, P.A.

(57)    ABSTRACT

A method for processing a request for content by a routing device in a communication network implementing a name-based routing. The device includes plural interfaces to receive a request for content and a data packet associated with a content, and a routing table adapted to determine, based on a content name, at least one interface to route the request. The method includes: receiving the request through a first interface; if the device is not able to provide said data packet, searching for the name of the content in a table of pending requests associated with the first interface; in case the content name does not appear in the table, storing the name of the content in the table; and transmitting the request through at least one second interface, the second interface being determined as a function of the name of the content on the basis of the routing table.

8 Claims, 3 Drawing Sheets

METHOD FOR PROCESSING A REQUEST IN AN INFORMATION-CENTRIC COMMUNICATION NETWORK

CROSS-REFERENCE TO RELATED APPLICATIONS

This Application is a Section 371 National Stage Application of International Application No. PCT/FR2012/052677, filed Nov. 20, 2012, which is incorporated by reference in its entirety and published as WO 2013/076418 on May 30, 2013, not in English.

FIELD OF THE DISCLOSURE

The invention relates to a method for processing a request relating to a content in an information-centric communication network, implementing name based forwarding.

BACKGROUND OF THE DISCLOSURE

The article by Van Jacobson et al. entitled "Networking Named Content", published in 2009 in the proceedings of the CoNEXT'09 conference, presents a new architecture called Content-Centric Networking (CCN). This architecture proposes to change the current communication model based on physical addressing in a network by a new communication model based on addressing by content name. In such a network, the idea is therefore to propose, find and deliver content rather than reaching equipment devices and maintaining connections between these equipment devices.

In order to obtain a content in such a network, a client entity sends in the network a request relating to this content and comprising the name of the content. Such a request is referred to as an interest packet. On reception of this request on a given network interface, a forwarding node of the network, or CCN node, checks whether it has the desired content. To this end, it consults a table of contents which it contains and which stores contents. If it has the desired content, it sends it to the network interface via which the request was received, to the client entity, optionally via other forwarding nodes of the network. If it does not have the desired content, it checks in a pending interest table (PIT) whether it has already received a previous request relating to the same content via the same interface or another interface and sent the previous request to other forwarding nodes of the network. If this is not the case, that is to say if it finds no trace of a previous request relating to the same content in its pending interest table, it stores the name of the desired content in its pending interest table in association with an identifier of the interface via which the request was received. It subsequently forwards the request in the communication network by means of a forwarding information base (FIB) which it has and which indicates, as a function of the requested content name, to which other node or nodes of the network to transfer the request. If, however, its pending interest table PIT already comprises the name of the desired content in association with the identifier of another interface, it does not send the received request but instead, in its pending interest table PIT, associates with the name of the desired content an identifier of the interface via which the request was received. This is because, if the pending interest table already comprises the name of the desired content, this means that a request relating to this content has previously been received and transferred in the network, and that the node is waiting for a response to this request.

The pending interest table PIT thus stores the names of the requested contents in association with the identifiers of all the interfaces through which the content has been requested, and should therefore be sent in response.

When a content is received on a given interface by the forwarding node, after a request relating to this content has been sent by this node, the node then consults its pending interest table and sends the content over all the interfaces which are associated with the name of the content. The pending interest table therefore makes it possible to find the path which a content should take in order to reach the client entity or entities which have requested it.

In this known architecture of CCN nodes, the contents are organized hierarchically in a tree form. The name of the content takes this organization into account. For example, /orange/map/lannion/site/batWA.jpg and /orange/map/lannion/site/batWB.jpg are two content names which share a common tree location, in this case /orange/map/lannion/site/. It can be seen that the name of a content is of variable size, depending on the size of the tree location in which the content is located. In order to process an interest packet, a CCN forwarding node must therefore store and handle content names represented over an arbitrary number of bits as well as the identifier of the interface, or identifiers of the interface, on which the interest packets were received. The pending interest table PIT of a CCN node, which stores all the received interest packets as well as the information relating to the path which the content must take, may then constitute a weakness of a CCN network because of the size which this table may reach. In fact, since CCN networks are intended to forward all the content made available on the Internet, it will be understood that such a table may store megabytes or even gigabytes of information. It is moreover known that the larger the size of the pending interest table is, the longer are the access times to the data which it contains. This can significantly impair performance of a CCN network.

SUMMARY

According to a first aspect, the invention relates to a method for processing a content request by a forwarding device in a communication network implementing name based forwarding, the device comprising a plurality of interfaces capable of receiving at least one content request and at least one data packet associated with a content, and a forwarding information base adapted to determine, as a function of a requested content name, at least one interface to which to forward the content request, said method comprising:

a step of receiving the content request through a first interface of the device, if the device is not capable of providing said data packet associated with the content, a step of searching for the name of the content in a pending interest table associated with the first interface, via which the request was received, in the event that the content name does not appear in the pending interest table associated with the first interface, a step of storing the name of the requested content in said table, and a step of sending the request through at least one second interface, said second interface being determined as a function of the name of the requested content on the basis of the forwarding information base of said device.

According to the invention, a pending interest table specific to the content requests received on this interface is associated with each interface of the forwarding device. It can readily be understood that, compared with the known use of a CCN forwarding device which comprises a global pending interest table, each of the pending interest tables associated with each of the interfaces of the device has a much smaller size than the global table. This is because the table dedicated to an interface stores only the content requests received on the interface. Furthermore, since the table is dedicated to the interface, it is not necessary to store the identifier of the interface, or identifiers of the interface, on which the content requests were received. Since the pending interest tables are smaller, it will be understood that access to these tables is faster, which optimizes the time for processing the pending interests by the device. This gain in each forwarding device of a network contributes to improving the performance of the network.

Furthermore, providing one pending interest table per interface makes it possible to use resources specific to each of the interfaces. Such resources may be the memory allocated to each of the interfaces and/or particular components, such as ASIC components (Application-Specific Integrated Circuits). This optimizes the use of resources of the device, and saves on the overall resources of the device, which contributes to improving the overall performance of the device.

Furthermore, even if a request relating to the same content is received on two different interfaces and it is therefore forwarded two times in the network, the node or nodes to which the request is forwarded merge these two requests. Thus, the relevant node or nodes store only one occurrence of the name of the requested content in their pending interest table.

Advantageously, the method according to the invention comprises:

a step of receiving the data packet associated with the content via the second interface, the data packet comprising the name of the content, a step of interrogating pending interest tables associated respectively with the interfaces, on the basis of the name of the content, in order to determine at least one relevant interface, the associated pending interest table of which comprises the name of the content, a step of sending the data packet through the relevant interface.

Upon reception of a data packet on one of the interfaces, in response to a content request forwarded by the device in the network, a search for the interfaces to which the data packet should be sent is optimized because each pending interest table PITi is specific to one interface $int_i$. Moreover, the searches in the various tables can be done in parallel. As these tables are smaller than a global table common to all the interfaces, the time taken to search for the relevant interfaces is therefore shorter.

According to one exemplary embodiment, the method according to the invention comprises:

a step of receiving a command to reset the pending interest tables associated respectively with the interfaces, coming from a quality of service supervision entity, a step of resetting the pending interest tables of the device.

Once more, a reset of the tables ordered by a quality of service management entity is faster in the case of a reset of a plurality of tables, each being specific to an interface, than in the case of a global table. This is because the reset commands can be carried out in parallel.

According to one exemplary embodiment of the invention, the method comprises a step of formatting the name of the content after reception of the content request.

The formatting step according to the invention makes it possible to overcome representational differences between devices or entities of the network. Thus, by means of the formatting, a content name has a common representation for all the devices of the network. This avoids different processing of two slightly different content names which reference the same content.

According to one exemplary embodiment, the pending interest table is implemented by means of a counting Bloom filter, the filter being a table of m counters, the step of storing the name of the content comprising:

application of a determined number of hash functions $h1, \ldots, hk$ to the name of the content, the applied functions respectively producing a number lying between 0 and $m-1$, an increment of one of the counters of the filter which are associated with indices of the filter, said indices being equal to the respective values produced by the hash functions.

In the exemplary embodiment described here, the pending interest tables PITi are implemented by means of counting Bloom filters. It is known that a Bloom filter, with or without counters, is a compact probabilistic data structure whose size is fixed and independent of the number of elements contained. Such a table can therefore be extremely compact. It will be understood that such a structure is highly advantageous for storing very large number of content names of variable size. More precisely, it is representations of the content names which are stored in Bloom filters. The counting Bloom filter is adapted to record elements, in the present case representations of content names after application of hash functions to these content names, and to delete elements. The Bloom filter is therefore entirely suitable for storing representations of content names. Specifically, once a content name has been stored by means of its representation in a pending interest table implemented by a Bloom filter, the device needs to interrogate the filter in order to find out whether the content name is present in the filter, and to delete this content name when a request has been processed. Thus, counting Bloom filters optimize the memory size required by pending interest tables and contribute to optimizing the performance during processing in the network.

According to one exemplary embodiment, the forwarding device furthermore comprises a global Bloom filter, the method comprising:

on reception of the content request, a step of checking whether the name of the content is present in the counting Bloom filter which implements the pending interest table associated with the first interface, if the name of the content is present in the counting Bloom filter associated with the first interface, a step of checking whether the name of the content appears in the global Bloom filter, if the name of the content appears in the global Bloom filter, a step of blocking said content request.

It is known that Bloom filters are subject to false positives. This is because although it can be known with certainty that an element is absent from the Bloom filter, it can be known only with a certain probability that an element may be present in the filter. The global Bloom filter thus makes it possible to reduce the number of false positives. To this end, when a content request arrives on a given interface, the counting Bloom filter which implements the pending interest table associated with the interface is interrogated for the presence of the name of the requested content. If the counting Bloom filter indicates that the name of the content is present, then the interrogation of the general Bloom filter makes it possible to check whether the situation is a false positive. Specifically, if the general Bloom filter interrogated for the presence of the name of the content indicates that the name of the content is absent, this means that the situation is a false positive since this means that no content request relating to this content name has been forwarded by the device to another device. The number of false positives is thus limited.

Furthermore, if the general Bloom filter indicates that the name of the content is present, then it is assumed that a content request has already been forwarded in the network and that it is not necessary to forward it again. The content request is therefore blocked in the event that the counting Bloom filter specific to the interface on which the request has arrived and the general Bloom filter both indicate that the name of the requested content is present. In this case, it is assumed that the request is a duplicate request.

The invention also relates to a forwarding device in a communication network implementing name based forwarding, said device comprising:

a plurality of interfaces respectively adapted to receive at least one content request and at least one data packet associated with a content, a forwarding information base adapted to determine, as a function of a requested content name, at least one interface to which to forward the content request, a plurality of pending interest tables, each pending interest table being associated with a respective interface and arranged in order to store the name of a content requested by the interface with which it is associated, transmission means arranged in order to send the content request received on a first interface to a second interface, said second interface being identified as a function of the name of the content in the forwarding information base of said device.

The invention also relates to a network capable of implementing name based content forwarding, comprising:

at least one client entity adapted to send content requests, and a plurality of forwarding devices according to the invention.

The invention also relates to a program intended to be installed in a forwarding device of a communication network implementing name based forwarding, comprising instructions for carrying out the steps of the method for processing a content request according to the invention, which are executed by the device when the program is run by a processor.

The invention also relates to a data medium on which the computer program according to the invention is stored.

BRIEF DESCRIPTION OF THE DRAWINGS

Numerous details and advantages of the invention will be understood more clearly on reading the description of particular embodiments with reference to the appended drawings, which are given by way of nonlimiting example and in which:

FIG. 3a presents the steps of the request processing method which relate to the reception of the content request, FIG. 3b presents the steps of the request processing method which relate to the reception of a content, and FIG. 3c presents the steps of the request processing method which relate to a reset of the pending interest tables.

DETAILED DESCRIPTION OF ILLUSTRATIVE EMBODIMENTS

Figure 1:
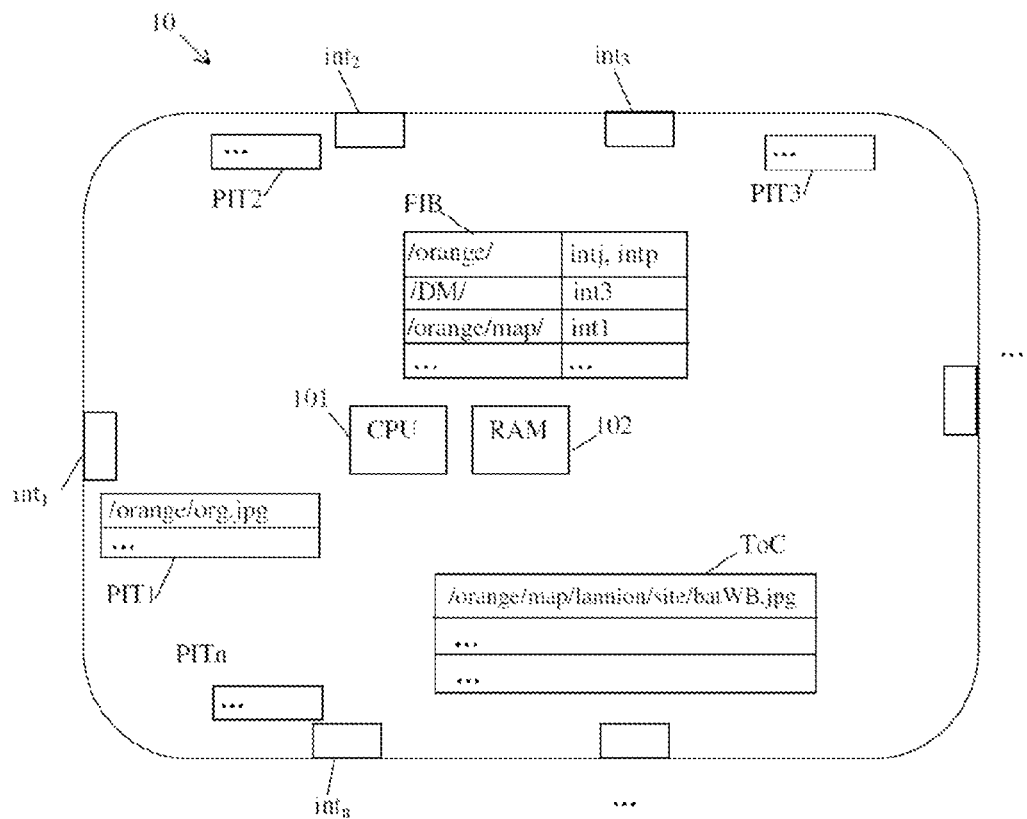
FIG. 1 presents a forwarding device of a communication network which implements name based forwarding, according to a first exemplary embodiment of the invention.

A forwarding device in a communication network which implements forwarding by content name, according to a first exemplary embodiment, will now be described with reference to FIG. 1.

Firstly, it will be noted that a content is embodied in the network by a data packet. The data packet comprises, in a header, the name of the content, for example /orange/map/lannion/site/batWA.jpg, as well as a sequence of bits which corresponds to the content per se. When information to be forwarded in the network, such as a film, for example /videos/lannion.mpg, is embodied in the network by a plurality of packets, then each of the packets is considered to be an entirely different content identified by a name which is specific to it, for example /videos/lannion.mpg/part1 and /videos/lannion.mpg/part2.

A forwarding device 10 or CCN device (Content-Centric Networking) according to the invention is adapted to:

receive a content request from one or more client entities, or from a second forwarding device (these are not represented in FIG. 1), or several of the latter. The content request, or interest packet, comprises a requested content name, for example /orange/map/lannion/site/batWA.jpg.

forward the content request received from the client entity or the second node to one or more other forwarding devices of the network (these are not represented in FIG. 1), if it does not have the content in a table of contents, denoted by ToC, which it possesses. In this case, the device 10 receives the requested content in response from the other device in the form of a data packet, stores the received content in its table of contents ToC and sends the content to the client entity or the second device, in response to the initial request, provide the requested content if it contains the content in its table of contents ToC.

To this end, the forwarding node 10 comprises:

a processor 101, or CPU (Central Processing Unit), or processing unit. The processor is adapted to carry out the steps of the method for processing a content request which are described with reference to FIGS. 3a, 3b et 3c. The processor 101 is connected to a set of memories, namely:

a random access memory (RAM) 102 which makes it possible to carry out processing operations such as searches in tables, to make comparisons, to load and execute instructions, a plurality of interfaces $int_1$, $int_2$, $int_3$, . . . , $int_n$ adapted to communicate either with other entities of the network: the other forwarding devices, and/or the client entity or the second forwarding device, or with applications (not represented) hosted by the device 10. In particular, an interface is adapted in order to:

receive content requests from the client entity or the second forwarding node, send a content to the client entity or the second network node in response to the request. The content sent consists of a data packet. The data packet comprises the name of the content and a plurality of bits which corresponds to the content per se, send a received content request to other network forwarding devices through one or more other interfaces, when the request has not yet been received and when the forwarding device 10 does not have the requested content.

In order to carry out these operations, the device 10 furthermore comprises:

the table of contents ToC intended to store contents. The table of contents is based on known caching mechanisms, the operation of which is not described in detail here. A content is stored in the table of contents ToC when it is received from another network device, in response to a content request sent by the device 10 to this other device, a forwarding information base (FIB) intended to identify one or more interfaces to which to transmit a content request received by the device 10, when the device 10 does not have the requested content in its table of contents ToC. The forwarding information base FIB is thus intended to permit routing of the content request to other devices of the network which are capable of finding this content. Thus, when the device 10 does not have the requested content in its table of contents ToC and cannot therefore respond to the content request which it has received, by means of the forwarding information base FIB it identifies the interfaces to which to send the request, these interfaces making it possible to send the request to other nodes of the network. A datum stored in the forwarding information base FIB comprises all or part of a name of the content, for example /orange/map/, associated with one or more interfaces of the node 10, in the example of FIG. 1 the interface $int_1$. The way in which the forwarding information base FIB is populated is based on known protocols and is not described in detail here, according to the invention, a plurality of pending interest tables (PIT) denoted by PIT1, PIT2, PIT3, . . . , PITn. More precisely, one pending interest table PITi, 1≤i≤n, is associated with each of the interfaces $int_i$ of the device 10. For the interface $int_1$ with which it is associated, the pending interest table PITi is intended to store the name of the contents contained in the content requests which have been received via this interface and which are waiting for a response. It may be noted that, if two requests received by the same interface $int_i$ comprise the same content name, it is not necessary to store the name of the content two times in the pending interest table. This is because a data packet which is associated with the content, and which is sent in response on the interface $int_i$, constitutes a unique response to the two requests.

In one exemplary embodiment of the invention, the implementation of the forwarding device 10 uses counting Bloom filters.

A Bloom filter is a compact probabilistic data structure adapted to optimally store a very large amount of data, and to be interrogated for the presence or absence of a given element in the filter. More precisely, a Bloom filter is a table FB (not represented in FIG. 1) of m bits, initialized to 0. The various bits of the table FB are denoted by FB[0], . . . FB[m−1]. Recording an element x in the Bloom filter consists in recording an impression of the element x in the table FB. To this end, a determined set of selected hash functions, denoted for example by $h_1, \ldots, h_k$, are applied to the element x. The application of the k hash functions $h_1, \ldots, h_k$ to the element x makes it possible to obtain k positions $h_1(x), \ldots, h_k(x)$ in the table FB. Recording the impression of the value x in the table FB then consists in setting the values $FB[h_1(x)], \ldots, FB[h_k(x)]$ to 1. It is assumed that the use of seven hash functions, i.e. k=7, makes it possible to store two to three million entries optimally in a Bloom filter.

Bloom filters are structures which are highly suitable for storing a very large number of data. However, a known defect of Bloom filters is that they do not make it possible to manage the removal of elements from the filter correctly. A variant of Bloom filters, called a counting Bloom filter, overcomes this deficiency. A counting Bloom filter is a table FBc of m counters initialized to 0. Adding an element x in the counting Bloom filter then consists in incrementing by 1 the counters associated with the various positions in the table FBc, which are calculated by applying the hash functions $h_1, \ldots, h_k$ to the element x. By analogy, removal of the element x from the Bloom filter FBc consists in decrementing the same counters by 1.

In the exemplary embodiment of the device 10 described here, the pending interest table PITi associated with the interface $int_i$ of the node 10 is implemented by means of a counting Bloom filter denoted by $FBc_i$ (not represented in FIG. 1).

Using a counting Bloom filter to represent a pending interest table makes it possible to optimize the memory space needed for the pending interest table, and therefore contributes to improving performance.

In another exemplary embodiment, the forwarding device 10 also comprises a global table FBS (not represented in FIG. 1) implemented by means of a Bloom filter. This Bloom filter is intended to limit the number of false positives inherent in the use of Bloom filters, with or without counters.

Figure 2:
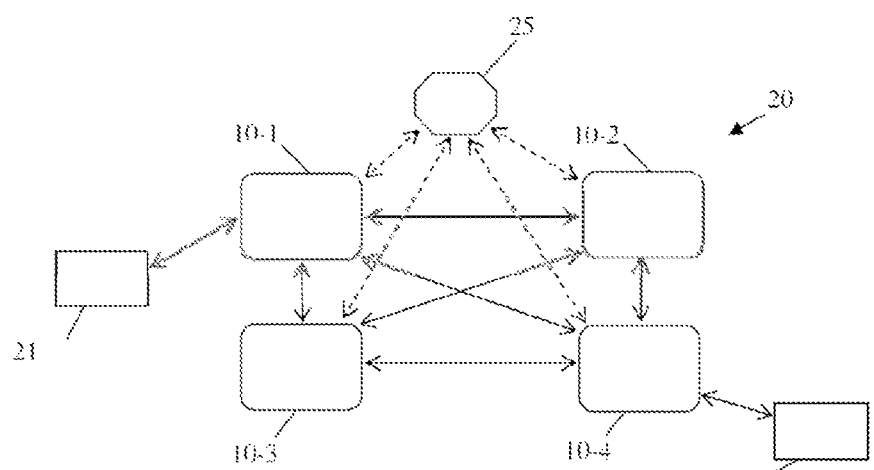
FIG. 2 is a schematic representation of a communication network which implements name based forwarding.

A communication network implementing name based content forwarding will now be presented with reference to FIG. 2.

A network 20 which implements name based forwarding comprises a plurality of network equipment devices:

a plurality of forwarding devices 10-1, 10-2, 10-3, 10-4, corresponding to the description of the device 10 presented with reference to FIG. 1;

a plurality of client entities 21-1, 20-2 adapted to send content requests and receive data packets in response, at least one quality of service management entity 22. The quality of service management entity 22 supervises the quality of service of the network 20; it has certain measurement elements adapted to measure the performance of the network and detect a deterioration in the quality of service below an acceptable level.

Only a few forwarding devices and a few client entities are represented in FIG. 2, although the network 20 is of course not limited in terms of the number of forwarding devices and client entities of which it is made up.

The steps of a method for processing a content request in a communication network implementing name based forwarding, according to a first exemplary embodiment, will now be described with reference to FIGS. 3a, 3b and 3c.

Figure 3A:
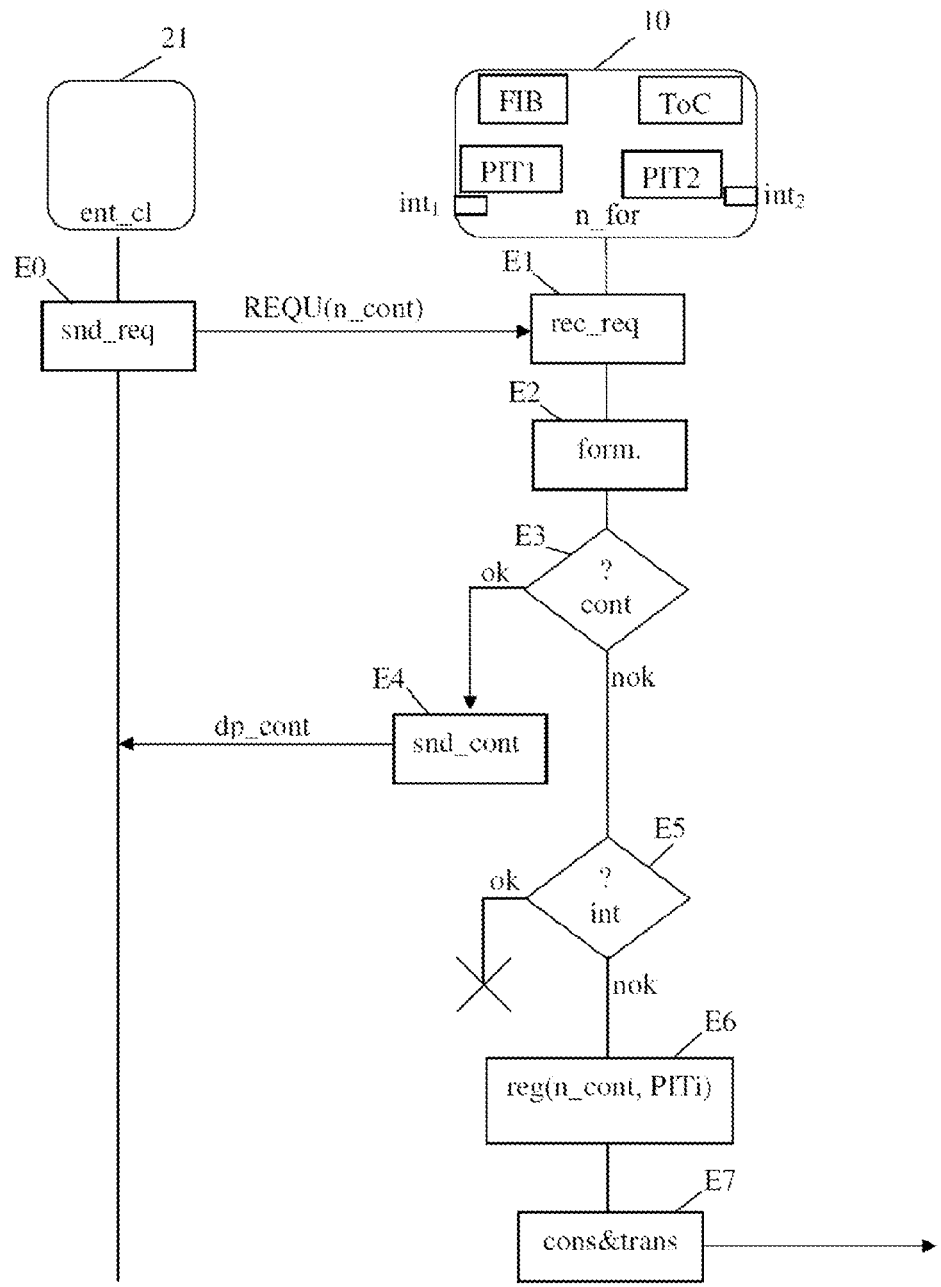
FIGS. 3a, 3b and 3c present the steps of a method for processing a content request in a communication network implementing name based forwarding, according to a first exemplary embodiment. More precisely.

More precisely, FIG. 3a describes the steps of the request processing method which relate to the reception of the content request.

The network 20 (not represented in FIG. 3a) comprises a plurality of network equipment devices, for example a client entity 21 capable of sending requests relating to contents and of receiving contents in response, and a forwarding device 10. The device 10 is capable of responding to a request if has the requested content and/or of forwarding the request to one or more other forwarding devices (not represented in FIG. 3a) if it does not have the content. The device 10 has a plurality of interfaces $int_i$, 1≤i≤n. A pending interest table PITi is associated with each of the interfaces $int_i$. The device 10 also comprises a forwarding information base FIB and a table of contents ToC. For the sake of simplicity, only two interfaces $int_1$ and $int_2$, and consequently two associated pending interest tables PIT1, PIT2, are represented in the figure. However, no limitation is placed on the number of interfaces.

In an initial step E0 of sending a request, the client entity 21 sends a content request REQU in the network 20. The request REQU comprises the content name n_cont.

In a reception step E1, the forwarding device 10 receives the content request REQU on a first interface, for example $int_1$.

In a formatting step E2, the device 10 formats the content name n_cont. The formatting of the content name n_cont is intended to obtain a representation complying with a representation scheme of the device 10. The formatting step makes it possible to overcome representational differences of the name of the content between the client entity 21 and the device 10. In one exemplary embodiment, the formatting step E2 consists in removing the accents from the content name n_cont.

In a content search step E3, the device 10 checks whether the requested content appears in its table of contents ToC. To this end, the device 10 checks whether the content name n_cont is present in its table of contents ToC.

In a step E4 of sending the content, corresponding to a case in which the requested content appears in the table of contents ToC of the device 10 (branch "ok" in FIG. 3a), the device 10 sends the content in the form of a data packet dp_cont through the first interface $int_1$ in response to the request REQU. This completes the processing of the request REQU.

If the requested content does not appear in the table of contents ToC of the device 10 (branch "nok" in the figure), then in an interest search step E5 the device 10 checks whether the name of the requested content n_cont already appears in the pending interest table PIT1 associated with the first interface $int_1$. The search step E5, intended to check whether there is already a request relating to this content undergoing processing by the device 10, makes it possible to avoid recording the same information, in this case the content name n_cont, two times in the pending interest table PIT1.

In a first case (branch "ok" in FIG. 3a), corresponding to a case in which the name of the content already appears in the pending interest table PIT1 associated with the first interface $int_1$, the device 10 does nothing, that is to say the processing of the request REQU is ended. This is because in this case the device 10 has already processed a request relating to the same content and it is waiting for the requested content.

In the second case (branch "nok" in FIG. 3a), corresponding to the event that the name of the content does not appear in the pending interest table PIT1 associated with the first interface $int_1$, during a recording step E6 the device 10 records the content name n_cont in the pending interest table PIT1 associated with the first interface $int_1$.

In a subsequent step E7 of consultation and transmission, following the recording of the content name n_cont in the pending interest table PIT1, the device 10 consults its forwarding information base FIB and sends the request on a second interface, for example $int_2$, associated in the forwarding information base FIB with a part of the name of the content, to another forwarding node of the network (not represented in FIG. 3a).

The steps of the request processing method which relate to the reception of a content in response to the forwarding of the content request by the device 10 to another forwarding device will now be described with reference to FIG. 3b.

Figure 3B:
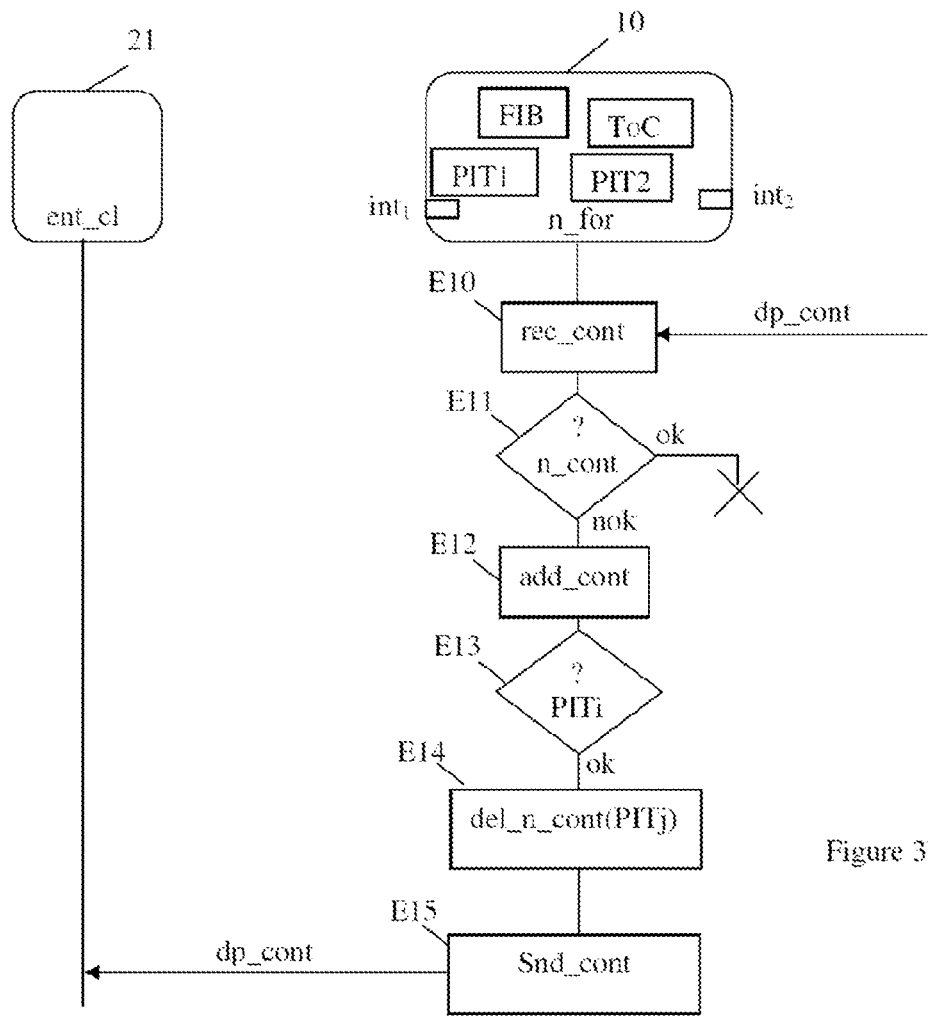

In a step E10 of receiving a content, the device 10 receives a content through the second interface $int_2$ in the form of a data packet dp_cont from another forwarding device (not represented in FIG. 3b). The reception of the content takes place following prior sending of a request for this content by the device 10 on the second interface $int_2$, in accordance with the step E7 of the method described with reference to FIG. 3a. The data packet dp_cont comprises the content name n_cont.

In a content search step E11, a check is made as to whether the received content is already stored in the table of contents ToC. To this end, the content name n_cont, which appears in the header of the received data packet dp_cont, is searched for in the table of contents ToC. If the content name n_cont already appears in the table of contents ToC (branch "ok" in the figure), then the processing of the received content is ended. This is because in this case the content is considered to be duplicated.

In another case, in which the content name n_cont does not yet appear in the table of contents ToC (branch "nok" in the figure), then in an adding step E12 the content n_cont is stored in the table of contents ToC.

In a subsequent step E13 of interrogating the pending interest tables, the device 10 interrogates all the pending interest tables PITi respectively associated with the interfaces $int_i$ of the device 10, in order to identify whether the content name n_cont appears therein. This step is intended to identify the interface or interfaces via which a request relating to this content was received, and therefore the interface or interfaces to which the content should be sent in response. Since the pending interest tables PITi according to the invention are smaller than the pending interest tables according to the prior art, it will be understood that a search in the pending interest tables PITi consumes less resources and therefore contributes to improving the performance of the network. In one exemplary embodiment of the invention, the pending interest tables are interrogated in parallel. In this way, the search time is optimized.

In a removal step E14, corresponding to a case in which the content name n_cont appears in at least one pending interest tables PITi, $1 \leq i \leq n$, the device 10 removes the content name n_cont from all the pending interest tables PITi in which it appears. It is assumed that the content name n_cont appears at least in the pending interest table PIT1 associated with the first interface $int_1$.

In a subsequent sending step E15, the device 10 activates a data packet on all the interfaces $int_j$ associated with the pending interest tables PITj in which the content name n_cont was found, so as to send the data packet dp_cont associated with the content on these interfaces. For example, the data packet dp_cont is activated on the first interface $int_1$ associated with the pending interest table PIT1 in which the content name n_cont is stored. Thus, the device 10 responds to the request or requests which it has received relating to the content n_cont.

The steps of the request processing method which relate to a reset of the pending interest tables will now be described with reference to FIG. 3c.

Figure 3C:
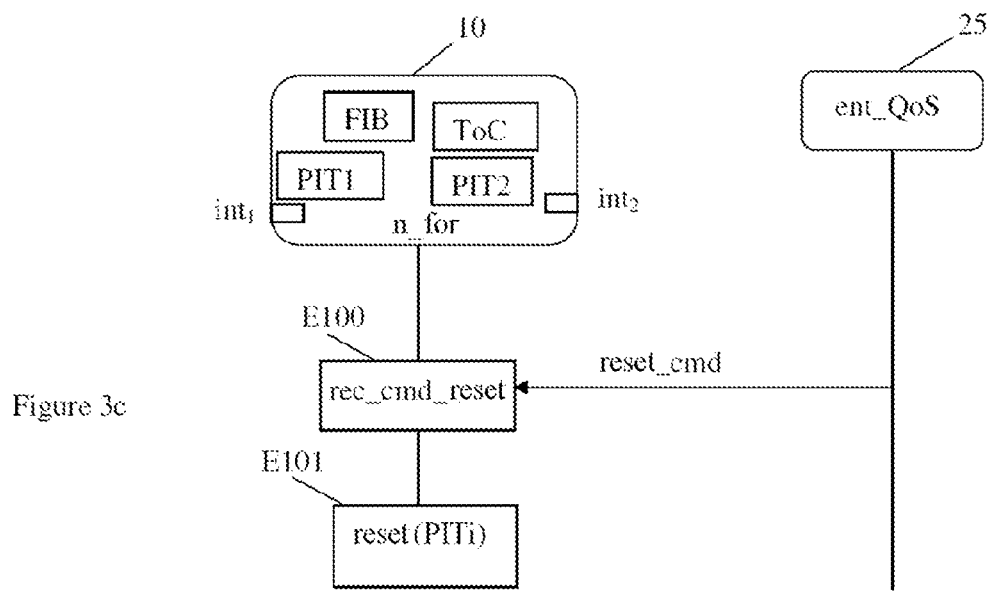

In a step E100 of receiving a reset command, the device 10 receives a reset command from the quality of service management entity 22 (not represented in FIG. 3c). Such a message is sent when the management entity 22 detects a deterioration in the quality of service in the network 20. Such a degradation in the quality of service may lead to an excessive number of requests without response in the device 10.

In a reset step E101, the device 10 orders deletion of all the pending interest tables PITi of the device 10. Thus, all the names of the contents stored in all the pending interest tables PITi are removed. In a first exemplary embodiment, all the pending interest tables PITi are deleted simultaneously. This is not detrimental to the network 20, since it is usual that, in a network, a request for which no response has been received at the end of a given period of time is resent by the client entity which initially sent it. In another exemplary embodiment, the pending interest tables are deleted one by one, the deletion of two tables being separated by a determined period of time. In this latter case, the deletion of a few pending interest tables may be sufficient to re-establish a correct quality of service. Thus, the requests stored in the pending interest tables not affected by the reset can be processed without resending requests.

In one exemplary embodiment of the invention, Bloom filters are used. More precisely, each pending interest table PITi, $1 \leq i \leq n$, of the forwarding device 10 is implemented by means of a counting Bloom filter FBi. Furthermore, the device 10 also comprises a general Bloom filter FBS intended to reduce the number of false positives inherent in the use of Bloom filters.

In this example, on reception of the content request REQU (n_cont) on the first interface $int_1$, in accordance with the reception step E1 described with reference to FIG. 3a, the device 10 formats the content name n_cont in accordance with the formatting step E2, then checks whether it has the content in its table of contents ToC, in accordance with step E3. If it finds the content in its table of contents ToC, in accordance with step E4, the device 10 activates a data packet dp_cont and sends it through the first interface $int_1$. In the event that it does not have the content, the device 10 interrogates the counting Bloom filter FB1 associated with the first interface $int_1$, in accordance with the interest search step E5. More precisely, the device 10 calculates the entry of the content name n_cont by means of the predefined hash functions $h_1, \ldots, h_k$. It therefore calculates $h_1(n\_cont), \ldots, h_k(n\_cont)$. If one or more of the values val1, ..., valk obtained are such that FBi(valj)=0, $1 \leq j \leq k$, then the requested content is not present in the pending interest table PIT1 associated with the first interface $int_1$. This means that the content has been requested for the first time through the first interface $int_1$. In accordance with the recording step E6, the device 10 then records the content name n_cont in the table PIT1 associated with the first interface $int_1$. To this end, the device 10 increments one of the counters associated with the $valj^{th}$ elements of the filter FB1. Thus, for all the values of j, FB1[valj]=FB1[valj]+1. The step E7 of consultation and transmission is then carried out so as to forward the request in the network.

If, on the other hand, all the values val1, ..., valk are such that the counters associated with the $valj^{th}$ elements of the filter FB1 are greater than or equal to 1, that is to say if FB1[valj]≥1, for $1 \leq j \leq k$, then it is necessary to check that the content request does not correspond to a false positive, that is to say that the content request is not considered dead as having already been received. To this end, the general Bloom filter FBS is interrogated so as to check whether the content name n_cont already appears in the general Bloom filter FBS. This would mean that the request relating to this content has already been received and processed by the device 10. Thus, the $valj^{th}$ values of the general filter FBS are checked. If there is at least one value equal to zero, that is to say if there is an index 1 such that FBS[1]=0, this means that the content request has been received for the first time. This is because the general Bloom filter FBS indicates that the content request has not yet been forwarded in the network and therefore that it has not yet been processed. It will be recalled that, by using a Bloom filter, it is possible to know with certainty that an element is absent from the filter. In this case, in accordance with the step E7 of consultation and transmission, the content request is forwarded in the network and the general Bloom filter FBS records the content name n_cont by setting to 1 the bits corresponding to the j calculated index values.

In the event that all the $valj^{th}$ values of the general Bloom filter FBS are equal to one, that is to say in a case in which it is known with a certain probability that the content request has already been forwarded in the network by the device 10 and therefore that this is a priori a second request relating to the same content, the content request is blocked and is not forwarded on the second interface. In this case, it is of course not recorded in the filter FB1 which implements the pending interest table PIT1 associated with the first interface $int_1$.

Thus, when the counting Bloom filter FB1 corresponding to the pending interest table PIT1 associated with the first interface $int_1$ and the general Bloom filter FBS both indicate that the name of the requested content is present, this means that the relevant request is a duplicate request. In the converse case, it is a false positive.

When a content arrives on an interface $int_i$ of the device 10, in accordance with the method steps described with reference to FIG. 3b, a search in the table of contents ToC is carried out, in accordance with the search step E11, so as to check whether the content n_cont is already stored therein. If this is the case, then the data packet dp_cont is deleted. This is because the content is in this case a duplicate content. In the event that the content has not already been stored in the table of contents ToC, then in accordance with the addition step E12 the content is stored in the table of contents ToC. A check is then made as to whether the content name n_cont appears in at least one pending interest table, in accordance with the step E13 of interrogating the pending interest tables PITi. To this end, the device 10 interrogates each of the counting Bloom filters FBi associated respectively with each of the interfaces $int_i$, on the basis of the content name n_cont. The entry of the content name n_cont is therefore calculated by means of the k hash functions $h_1, \ldots, h_k$, and a check is made as to whether the k $valj^{th}$ counters of the filter FBi are greater than or equal to 1, that is to say whether FBi[valj]≥1. If this is the case, then according to the removal step E14 the entry of the content name n_cont is removed from the Bloom filter FBi. To this end, the k $valj^{th}$ counters of the filter FBi are decremented by one. The data packet dp_cont is then sent on the interface $int_i$, in accordance with the sending step E15.

Although the present disclosure has been described with reference to one or more examples, workers skilled in the art will recognize that changes may be made in form and detail without departing from the scope of the disclosure and/or the appended claims.

The invention claimed is:

1. A method for processing a content request by a forwarding device in a communication network implementing name based forwarding, the device comprising a plurality of interfaces capable of receiving at least one content request and at least one data packet associated with a content, and a forwarding information base adapted to determine, as a function of a requested content name, at least one interface to which to forward the content request, said method comprising:
   receiving the content request through a first interface of the device,
   if the device is not capable of providing said data packet associated with the content, searching for the name of the content in a pending interest table associated with the first interface, via which the request was received, wherein the pending interest table is implemented by a counting Bloom filter, the filter being a table of m counters,
   in the event that the content name does not appear in the pending interest table associated with the first interface, storing the name of the requested content in said table, wherein storing the name of the content comprises:
      application of a determined number of hash functions h1, ..., hk to the name of the content, the applied functions respectively producing a number lying between 0 and m−1, and
      an increment of one of the counters of the filter which are associated with indices of the filter, said indices being equal to the respective values produced by the hash functions, and
   sending the request through at least one second interface, said second interface being determined as a function of the name of the requested content on the basis of the forwarding information base of said device.

2. The method for processing a content request as claimed in claim 1, comprising:

receiving the data packet associated with the content via the second interface, the data packet comprising the name of the content, interrogating pending interest tables associated respectively with the interfaces, on the basis of the name of the content, in order to determine at least one relevant interface, the associated pending interest table of which comprises the name of the content, and sending the data packet through the relevant interface.

3. The method as claimed in claim 1, comprising:

receiving a command to reset the pending interest tables associated respectively with the interfaces, coming from a quality of service supervision entity, and resetting the pending interest tables of the device.

4. The method as claimed in claim 1, comprising formatting the name of the content after reception of the content request.

5. The method as claimed in claim 1, wherein the forwarding device furthermore comprises a global Bloom filter, the method comprising:

on reception of the content request, checking whether the name of the content is present in the counting Bloom filter which implements the pending interest table associated with the first interface, if the name of the content is present in the counting Bloom filter associated with the first interface, checking whether the name of the content appears in the global Bloom filter, if the name of the content appears in the global Bloom filter, blocking said content request.

6. A forwarding device in a communication network implementing name based forwarding, said forwarding device comprising:

a plurality of interfaces respectively adapted to receive at least one content request and at least one data packet associated with a content, a forwarding information base adapted to determine, as a function of a requested content name, at least one interface to which to forward the content request, a plurality of pending interest tables, each pending interest table being associated with a respective interface and arranged in order to store the name of a content requested by the interface with which it is associated, wherein each pending interest table is implemented by a counting Bloom filter, the filter being a table of m counters, and arranged to store the name of the content by:

application of a determined number of hash functions h1, ..., hk to the name of the content, the applied functions respectively producing a number lying between 0 and m−1, and an increment of one of the counters of the filter which are associated with indices of the filter, said indices being equal to the respective values produced by the hash functions, and a transmission device arranged in order to send the content request received on a first interface to a second interface, said second interface being identified as a function of the name of the content in the forwarding information base of said forwarding device.

7. A network capable of implementing name based content forwarding, comprising:

at least one client entity adapted to send content requests, and a plurality of forwarding devices as claimed in claim 6.

8. A non-transitory data storage medium comprising a program stored thereon, the program comprising instructions for carrying out a method for processing a content request in a communication network implementing name based forwarding, when the instructions are executed by a processor of a forwarding device, the device comprising a plurality of interfaces capable of receiving at least one content request and at least one data packet associated with a content, and a forwarding information base adapted to determine, as a function of a requested content name, at least one interface to which to forward the content request, said method comprising:

receiving the content request through a first interface of the forwarding device, if the forwarding device is not capable of providing said data packet associated with the content, searching for the name of the content in a pending interest table associated with the first interface, via which the request was received, wherein the pending interest table is implemented by a counting Bloom filter, the filter being a table of m counters, in the event that the content name does not appear in the pending interest table associated with the first interface, storing the name of the requested content in said table, wherein storing the name of the content comprises:

application of a determined number of hash functions h1, ..., hk to the name of the content, the applied functions respectively producing a number lying between 0 and m−1, and an increment of one of the counters of the filter which are associated with indices of the filter, said indices being equal to the respective values produced by the hash functions and sending the request through at least one second interface, said second interface being determined as a function of the name of the requested content on the basis of the forwarding information base of said forwarding device.

* * * * *